F. W. BISHOP.
TROLLEY STAND.
APPLICATION FILED JULY 19, 1911.

1,118,100. Patented Nov. 24, 1914.

Witnesses
E. B. Filchrist
H. P. Sullivan

Inventor
Fred W. Bishop
by Thurston & Kwis
Attorneys

UNITED STATES PATENT OFFICE.

FRED W. BISHOP, OF CLEVELAND, OHIO, ASSIGNOR TO THE HOLLAND TROLLEY SUPPLY COMPANY, OF CLEVELAND, OHIO, A CORPORATION OF OHIO.

TROLLEY-STAND.

1,118,100.  Specification of Letters Patent.  Patented Nov. 24, 1914.

Application filed July 19, 1911. Serial No. 639,276.

*To all whom it may concern:*

Be it known that I, FRED W. BISHOP, a citizen of the United States, residing at Cleveland, in the county of Cuyahoga and State of Ohio, have invented a certain new and useful Improvement in Trolley-Stands, of which the following is a full, clear, and exact description.

Trolley stands, such as are in common use, have one part which is fixed to the car roof and another part which is rotatively mounted on the fixed part so as to be capable of turning thereon on a vertical axis. Anti-friction devices, such as balls, are generally interposed between these two parts. The trolley pole socket is pivoted on a horizontal axis to the rotatable member mentioned, and a spring or springs are suitably arranged so that by their action on the trolley pole socket they impart to it a tendency to swing upward the vertical conductor. The wires through which the current flows from the trolley stand to the motor on the car have heretofore been electrically connected with the fixed base member of the trolley stand. This obviously requires that the current brought into the car shall flow through the anti-friction balls; and this is objectionable.

The chief object of the present invention is to provide a suitable trolley stand which is so constructed that the current does not flow from the pole socket to the motor over a path which includes the anti-friction balls. And the novel feature by which this result is secured is the pivoting to the rotatable member of the stand, in an axial position, an arm provided with means for connecting it with the conductor wires which go from the trolley stand to the motor.

The invention broadly defined resides in the novel feature specified; but the invention also includes the more specific construction by means of which said novel feature is rendered practicable.

Figure 1:
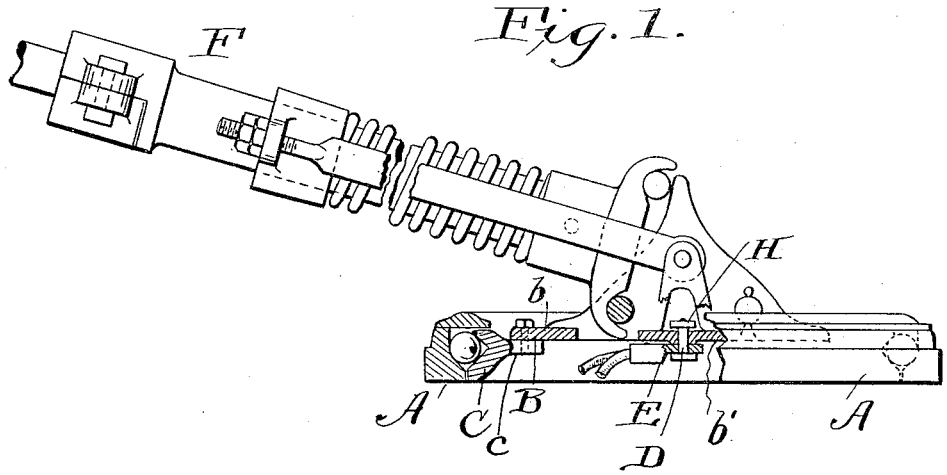
Figure 2:
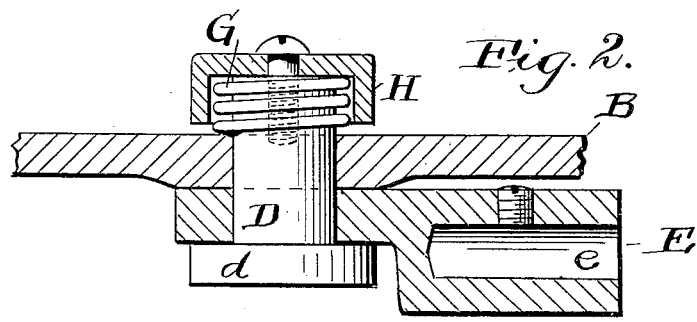
Figure 3:
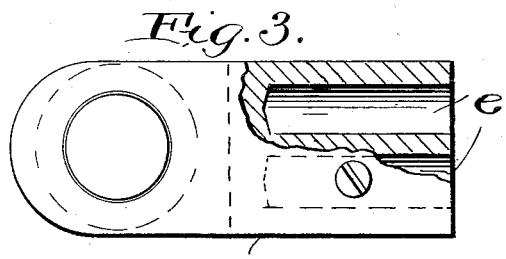

In the drawing, Figure 1 is a side elevation properly sectioned of a trolley stand which embodies the present invention. Fig. 2 is a vertical axial section through the center of the member B and the arm E. Fig. 3 is a plan view of the arm E partly broken away.

Referring to the parts by letters, A represents the base member of the trolley stand, said member being adapted to be fixed to the car roof. It is in the form of a ring having a groove in its inner periphery which forms one-half of a ball race-way. The other half of this race-way is a groove in the outer periphery of a ring C which fits within the ring A. The balls which may be put into the race-way through a hole in the member A, hold the two rings in the stated relative positions, and permit ring C to turn relative to member A about a vertical axis,—and with little friction.

The ring C has inwardly projecting lugs c to which the member B may be fixed by suitable bolts, so that it must share with the member C its rotary movement about the vertical axis of the ball race-way.

The trolley pole socket F is pivoted on a horizontal axis to the member B by any suitable means. The manner of so pivoting the trolley pole socket and the spring-actuated means for imparting to this trolley pole socket its tendency to swing upward, are shown in the drawing in a practically efficient form; but since they constitute no part of the present invention, and since any other suitable mechanism for the purpose may be employed in their stead it is not thought necessary to describe such parts herein. It should be stated, however, that in Fig. 1 the pole socket is locked in an inclined position by a pin inserted between the pocket and a part of the rotatable portion of the base. When the pole is in use this pin is removed, in which event the pole tends to assume a vertical position.

The member B has a spider like center, comprising the integral cross arms b and the plate b' formed by the merger of said arms at the axis of the rotary movement of said member B. An arm E lies beneath this plate b' and is pivoted thereto on a vertical axis which is coincident with the axis of members B and C, so that this arm need not partake of the turning movement of the member B and ring C. In the end of this arm are sockets e for the reception of the conductor wires over which the current is conducted to the motor on the car.

It is evident that the current taken from the overhead wire by the trolley wheel will flow over the trolley pole socket to member C and therefrom into this arm E without passing over the anti-friction balls; and that from this arm C the current will flow through practically immovable wires connected therewith to the motor.

In order that the electrical connection between this arm E and the member C shall be always effective there is a hole in the arm E, and another through the central plate $b'$ of the member B. A pivoting stud D having a head $d$ on its lower end passes up through these two holes. A cap H is fixed to the projecting upper end of this stud; and a coiled spring G is placed around the stud and between the central plate $b'$ and the cap H. This spring always acts to hold the arm E in electrical contact with the plate $b^2$. When the connected members B and C turn on a vertical axis this plate does not turn, but preserves a fixed relation to the conductor wires and to the car generally.

The spider like formation of the middle part of the member B makes it easy for a workman to reach down and connect and disconnect the conductor wires and arm E.

One feature of advantage in the above described construction is the facility with which the member B and the parts which it carries may be disconnected from the ring C (as by taking out the connecting bolts), when, for any purpose, as, for example, injury to the member B or the parts supported thereby, it is desirable to disconnect them.

Having described my invention, I claim:

1. In a trolley stand, the combination of a base member adapted to be fixed to the top of a car, of a member rotatably mounted on said base member, with anti-friction devices interposed between them, said rotatable member being adapted for supporting the trolley pole socket, and an arm pivotally connected with said rotatable member, with the axis of the pivot coincident with the axis of rotation of said rotatable member, and said arm being provided with means for the connection therewith of conductor wires.

2. In a trolley stand, the combination of a substantially flat base member adapted to be fixed to the top of a car, of a substantially flat member rotatably mounted on said base member with anti-friction devices interposed between them, said rotatable member supporting the trolley pole socket, an arm which is adapted for connection with the conductor wire, a pivot by which said arm is pivoted to said rotatable member,—said pivot being disposed axially with respect to the rotatable member.

3. In a trolley stand, the combination of a base member adapted to be fixed to the top of a car, of a member rotatably mounted on said base member with anti-friction devices interposed between them, said rotatable member supporting the trolley pole socket, an arm which is adapted for connection with the conductor wire, a pivot by which said arm is pivoted to said rotatable member,—said pivot being disposed axially with respect to the rotatable member, and a spring which embraces said pivot and acts to yieldingly hold said arm in contact with said rotatable member.

In testimony whereof, I hereunto affix my signature in the presence of two witnesses.

FRED W. BISHOP.

Witnesses:
H. R. SULLIVAN,
E. L. THURSTON.

Copies of this patent may be obtained for five cents each, by addressing the "Commissioner of Patents, Washington, D. C."